Dec. 4, 1934.      P. SCHMIDT      1,983,405
METHOD OF PRODUCING MOTIVE FORCES ON AIRCRAFT, BY THE
EXPLOSION OF INFLAMMABLE MIXTURES OF SUBSTANCES
Filed April 15, 1931      5 Sheets-Sheet 1

Inventor:
Paul Schmidt,
by
Att'ys.

Dec. 4, 1934.   P. SCHMIDT   1,983,405
METHOD OF PRODUCING MOTIVE FORCES ON AIRCRAFT, BY THE
EXPLOSION OF INFLAMMABLE MIXTURES OF SUBSTANCES
Filed April 15, 1931   5 Sheets-Sheet 2
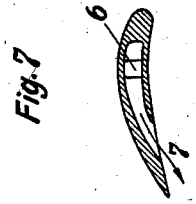
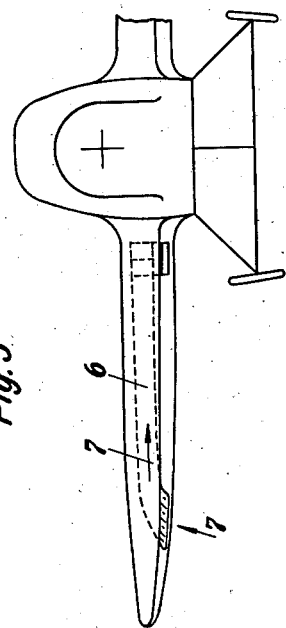
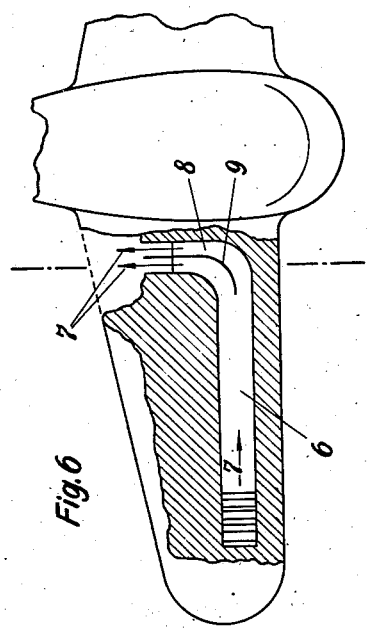
Inventor:
Paul Schmidt,
by
Att'ys.

Dec. 4, 1934.  P. SCHMIDT  1,983,405
METHOD OF PRODUCING MOTIVE FORCES ON AIRCRAFT, BY THE
EXPLOSION OF INFLAMMABLE MIXTURES OF SUBSTANCES
Filed April 15, 1931  5 Sheets-Sheet 3

Inventor:
Paul Schmidt,
by
Attys.

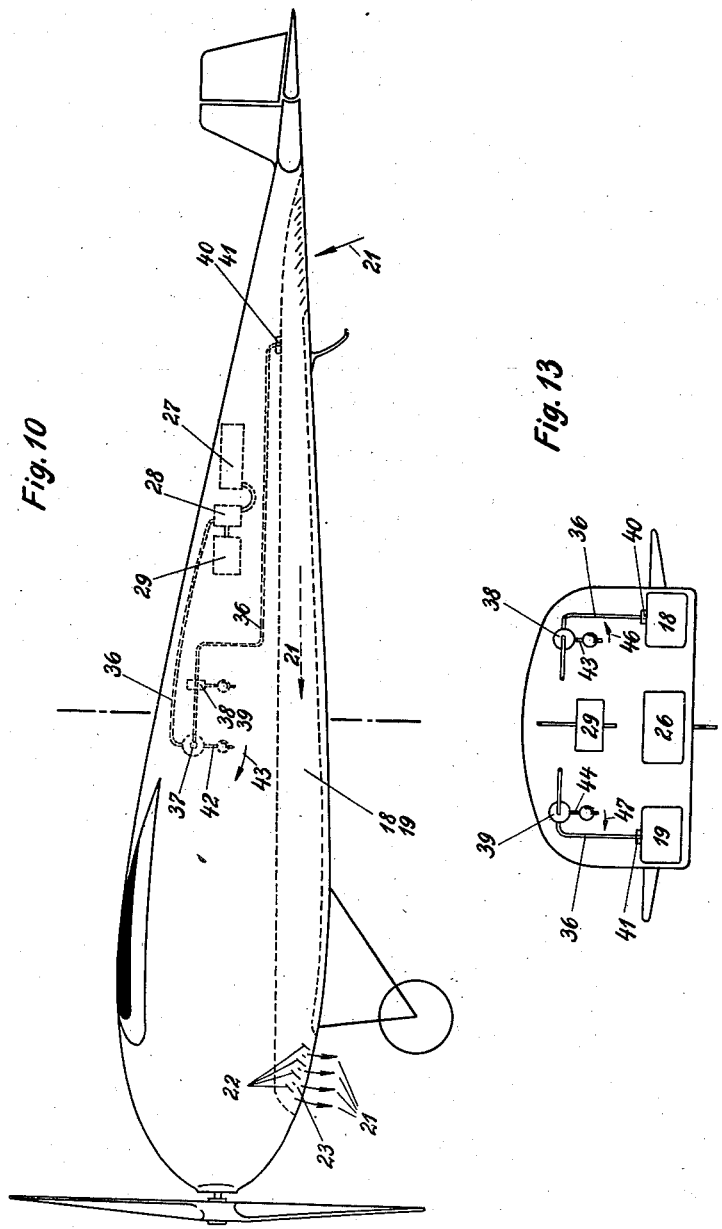

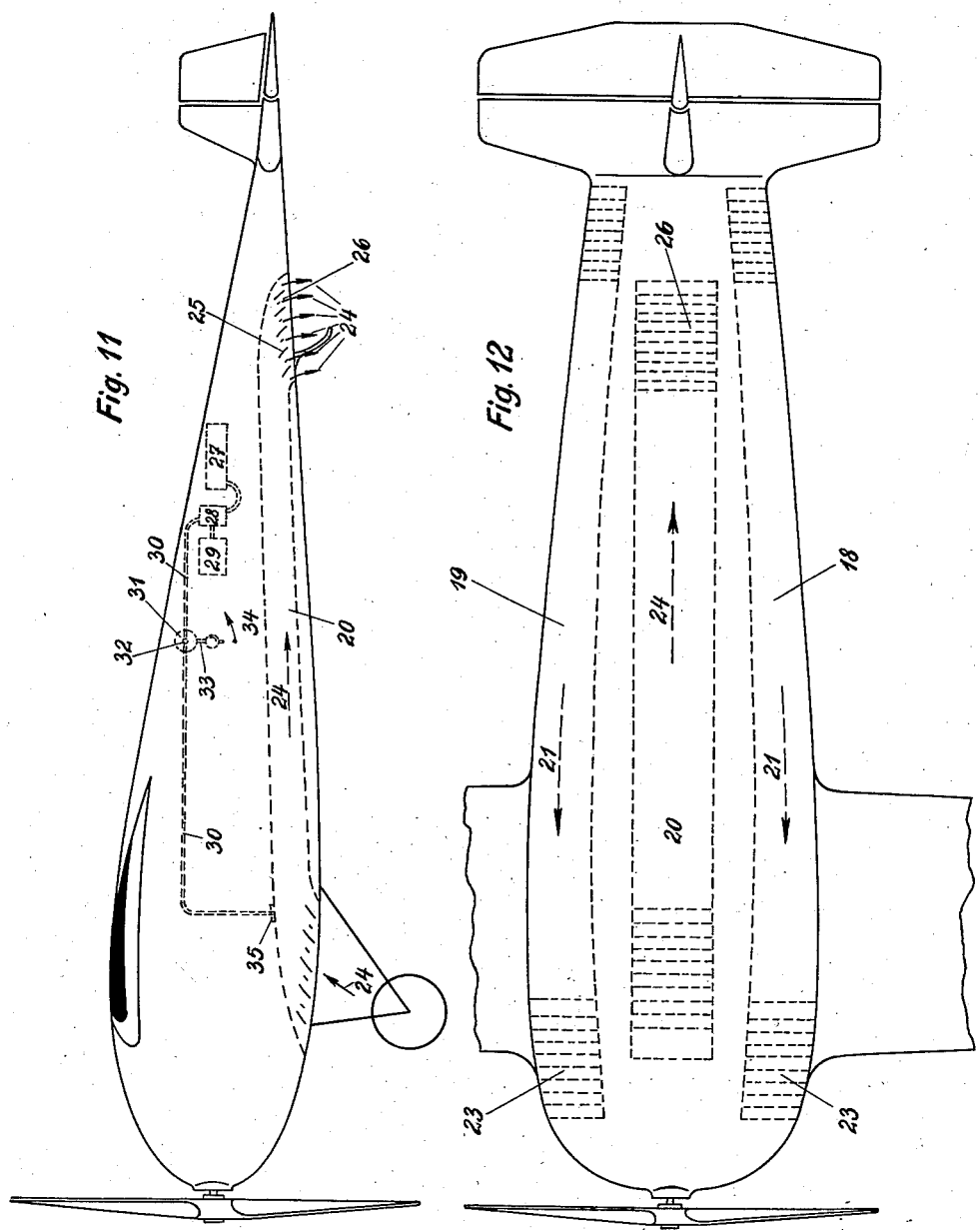

Patented Dec. 4, 1934

1,983,405

UNITED STATES PATENT OFFICE

1,983,405

METHOD OF PRODUCING MOTIVE FORCES ON AIRCRAFT, BY THE EXPLOSION OF INFLAMMABLE MIXTURES OF SUBSTANCES

Paul Schmidt, Munich, Germany

Application April 15, 1931, Serial No. 530,360
In Germany April 23, 1930

9 Claims. (Cl. 244—18)

The invention relates to a method of producing very great reaction forces, more particularly for propelling aeroplanes, in order to lift the latter out of their position of rest on the ground or to cause them to descend slowly with reduced flying speed. For this purpose, the force of expansion of inflammable mixtures of substances is utilized in a novel and technically very advantageous manner.

The method according to the invention consists more fully in that a quantity of air of a weight many times greater than that of the inflammable mixture of substances is directly accelerated by the force of the excess pressure of the exploded mixture.

The method may be carried out, for example, in a very simple form in known substantially tubular reaction chambers which are open at one end. The reaction chamber is charged with air. After charging, a small portion of that mass of air which is most remote from the outlet opening of the reaction chamber is mixed with combustible substances and thereupon this mixture, which for example may only amount to 5% of the total contents of the reaction chamber, is exploded. The expansion of the explosion gases causes the expulsion of the entire mass from the reaction chamber, whereby the mass of air which has not been mixed with fuel is pushed by the force of the excess pressure of the expanding gases like an air piston in front of the said gases. A particularly good efficiency for the transmission of energy is secured by means of the displacement effect of the expanding gases.

For the purpose of securing an almost continuous effect of the reaction force, the process may be repeated in rapid succession and carried out in a plurality of reaction chambers working in parallel.

The simplest means of transmitting the force of the excess pressure of expanding gases directly to a mass of air for the purpose of accelerating the said mass of air is undoubtedly the displacement of the air from a chamber by the expansion of the gases. Many special means have become known, however, for receiving, transmitting and utilizing the force of the pressure of expanding gases for special purposes, for example for producing the rotary motion of a shaft. A far-reaching transformation, on these lines, of the pressure forces, for example by means of an internal combustion engine and a propeller driven by the said engine, does not come into consideration as regards the method according to the invention. On the other hand, however, much knowledge and many constructions are already available in the relevant art for receiving the explosion pressure of inflammable substances, which may be applied at once, by anyone skilled in the art, to the direct and technically extremely simple transmission of the forces of pressure to the large masses of air according to the invention.

In the known methods of producing large reaction forces, solid or liquid mixtures of inflammable substances, without admixture with air, are employed, or fuel-air mixtures are employed. The use of additional masses of air, not intended for the combustion but for the purpose of increasing the mass effect in the explosion by means of the direct utilization of the explosion pressure, has not become known heretofore. The method according to the invention is not affected by a method, described in the literature, of utilizing the velocity at which explosion gases issue from a reaction chamber for the purpose of aspirating air. The said known method is based on an ejector-like suction and pumping action of flowing combustion gases which have already expanded, but on the contrary does not utilize the pressure effect produced during the explosion.

For the purpose of producing motive forces, the utilization of the pressure effect for accelerating additional masses is, however, generally and fundamentally more advantageous than the utilization of the energy of flow by mixing, because it follows from the laws of mechanics on which the ejector effect is based, that an increase in the reaction force by means of the ejector effect is not possible.

In an ejector (jet apparatus) the acceleration of the admixed masses takes place according to the laws of plastic impact, and therefore the magnitude of motion (mass times velocity) of the whole of the mass leaving the ejector is always equal to the magnitude of motion of the power jet working the ejector. As, however, the magnitude of motion is also equal to the reaction force which may be produced by the flow of a mass, the reaction force is not changed by inserting a jet apparatus. On the contrary, due to the mixing process, there is such a considerable loss of energy that the increase in mass is outweighed by the reduction in velocity.

In the method according to the invention, on the contrary, no loss of energy takes place and the new method therefore provides a very substantial and economical increase in the reaction forces. As is known, the said forces depend upon the mass and velocity of the expelled substances, and the magnitude of the reaction force which is produced is proportional to the said mass and its velocity. The energy which must be spent in accelerating the mass depends in like manner upon the mass but also upon the square of the velocity, so that maximum economy is attained in the production of reaction forces in the case of relatively small velocities and relative large masses which are subjected to the said velocities.

By the method according to the invention, relatively large masses of air are subjected to relatively small velocities by the transmission of the expansion pressure, so that an outstanding economy is attained in the production of force. In addition to the small consumption of inflammable substances or fuel which the method according to the invention involves, there is, inter alia, the advantage that satisfactory cooling of the parts exposed to heat is secured in the simplest manner by means of the large, unburnt masses of air.

A particularly advantageous effect of the new method is secured when the weight of the mass of air is about ten to fifty times the weight of the inflammable mixture of substances. Such a ratio of the masses or weights provides, on the one hand, a small, technically readily controllable, initial pressure of the mixture which is exploded, and on the other hand, of course, an economically satisfactory efficiency in the production of motive forces in comparatively small apparatus. The apparatus for carrying out the method according to the invention would be very large, for example, if the production of the reaction force were to occur for such a small ratio by weight of the accelerated masses of air to the masses of the inflammable mixture, as is employed in the known petrol engine-propeller units. As is known, in the latter, at least 300-400 times as much air is accelerated by the propeller as is burnt in the cylinders of the engine. On the other hand, however, in the utilization of the energy of inflammable mixtures, without the simultaneous use of substantial quantities of additional reaction masses, and more particularly, however, in the utilization of the reaction forces of explosion gases alone, there are, in addition to a very uneconomical utilization of the energy, also heating effects which are technically very difficult to control.

The use of air as additional mass for increasing the reaction effect of explosion gases renders it obvious to constitute in known manner the inflammable mixture of substances such as air and a fuel. The necessary excess of air required will be attained in each case without appreciable increase in the apparatus, and in certain cases, due to the homogeneity of the additional mass of air and the inflammable air-fuel mixture, there will even be on the whole a simplification in apparatus, and more particularly the method will be easier to carry out technically.

In order to effect re-charging of a reaction chamber after the masses of air and gas have been expelled, preferably a portion of the energy of the mass of air and gas issuing from the reaction chamber at a high speed will be utilized. This may be accomplished for example, by employing a portion of the expelled masses to drive a suction blower which, in the case of a rapid succession of explosions or a plurality of reaction chambers working in parallel, may be driven continuously. On the other hand, the aspiration of fresh masses of air for charging the reaction chamber may be attained directly by means of the force of suction of the masses issuing with a high velocity from the reaction chamber. If, for example, as shown in Figures 1 to 4, the reaction chamber, extending in tubular form, is made comparatively long, the accelerated masses, towards the end of the expulsion process, produce a partial vacuum in the reaction chamber, and the supply of fresh masses of air may be effected, for example, by opening a valve. Figures 1 to 4 of the drawings illustrate the entire working apparatus and in addition a few details are shown which are particularly useful for carrying out the method.

Fig. 5 is a front elevational view of airplane wing with the invention applied thereto.

Fig. 6 is a plan view of the same, partly in section.

Fig. 7 is a vertical cross-sectional view of the wing in the zone of the discharge opening.

Figs. 10 and 11 are side elevations of a modification of the invention.

Fig. 12 is a plan view of this modification, and

Fig. 13 is a schematic view of the interior showing the location of the air passages and accessories.

The device substantially comprises a tubular reaction chamber 1, having its inlet end 2 so provided with flaps or valves 2' that the said end can be alternately closed and opened. The outlet end 3 is open.

Figure 1:
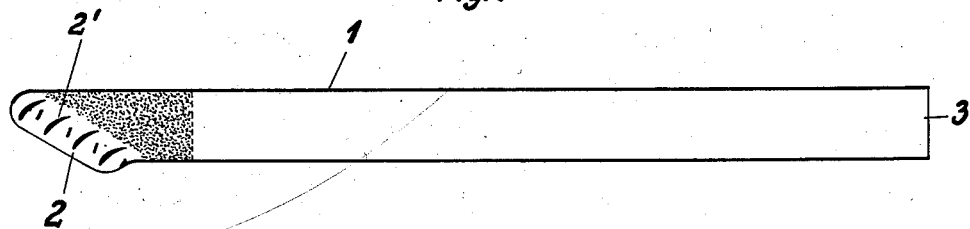
Figs. 1 to 4 are diagrammatic sketches of the successive steps in the cycle of operation of the propulsion means.

In Figure 1 is shown the first phase of the working process. The combustible mixture is introduced through the open valves 2' at the inlet end of the tubular body 1, or is formed by injecting petrol into the first part of the tube. As will be seen from the drawings, this mixture only occupies a very small fraction of the total space.

Figure 2:
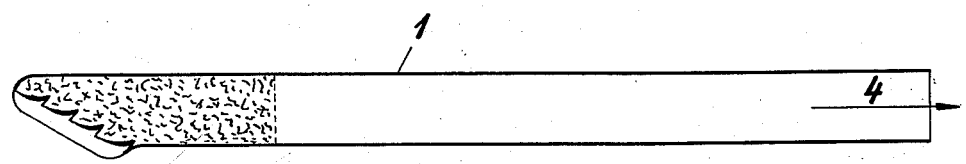

In Figure 2, the inlet end of the tube is closed by closing the inlet valves. As the valves are constructed as check or non-return valves, they close automatically on explosion in the present case. Expansion then occurs after explosion of the explosive mixture, as indicated in this figure, the expanded mixture still constituting a comparatively small fraction of the contents of the tube. The column of air filling the remaining portion of the tube then begins to flow in the direction of the arrow 4.

Figure 3:
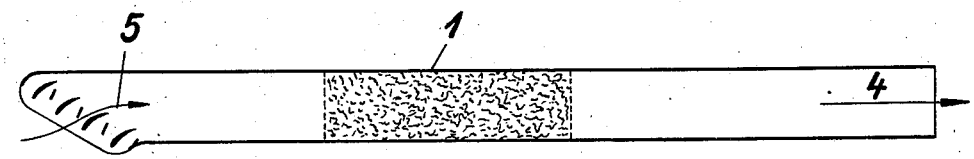

In Figure 3, the non-return valves at the inlet end of the tube 1 are again open, and the expanded combustion gases are advancing in the direction of the pressure flow (arrow 4). A suction flow is thereby produced behind the expanded combustion gases in the direction of the arrow 5. The expanded combustion gases and the air column in the flow tube 1 thus draw in by suction a fresh column of air at the inlet end.

Figure 4:
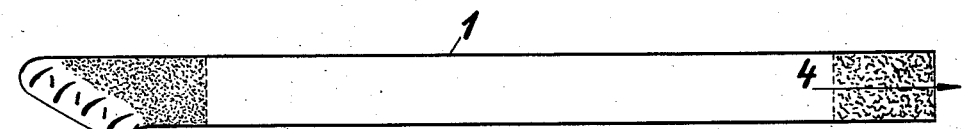

In Figure 4, the expanded mixture is on the point of leaving the outlet end of the flow tube, while the latter has been filled by suction with a fresh column of air. Finally, an inflammable mixture is drawn in at the inlet end of the air column or is formed afresh by the injection of petrol, and thereupon the cycle recommences.

As already follows from the Figures 1 to 4, it is necessary in carrying out the method according to the invention, to employ reaction chambers which are made comparatively long, so as to contain, in addition to the mass of inflammable mixture, masses of air many times greater. This very long extension of the reaction chambers, when the latter are employed as motive means for aeroplanes, requires in its turn that the tubular chambers should extend substantially along the fuselage of the aeroplane or along the supporting surfaces, in the latter case therefore, at right angles to the direction of flight, in order that the shape of the aeroplane will be satisfactory from the point of view of aerodynamics. In the arrangement of the tubular reaction chambers in the direction of the supporting surfaces, the reaction chambers may be advantageously placed within the supporting surfaces. As the direction of flow of the reaction masses, with the arrangement of the reaction tube in the direction of the supporting surfaces, runs substantially transversely to the direction of flight, deflection of the streaming masses at the outlet end of the reaction chambers will in general be necessary.

Several practical applications of the subject matter of the invention are shown diagrammatically in Figures 5 to 13 of the drawings.

Figures 8, 9:
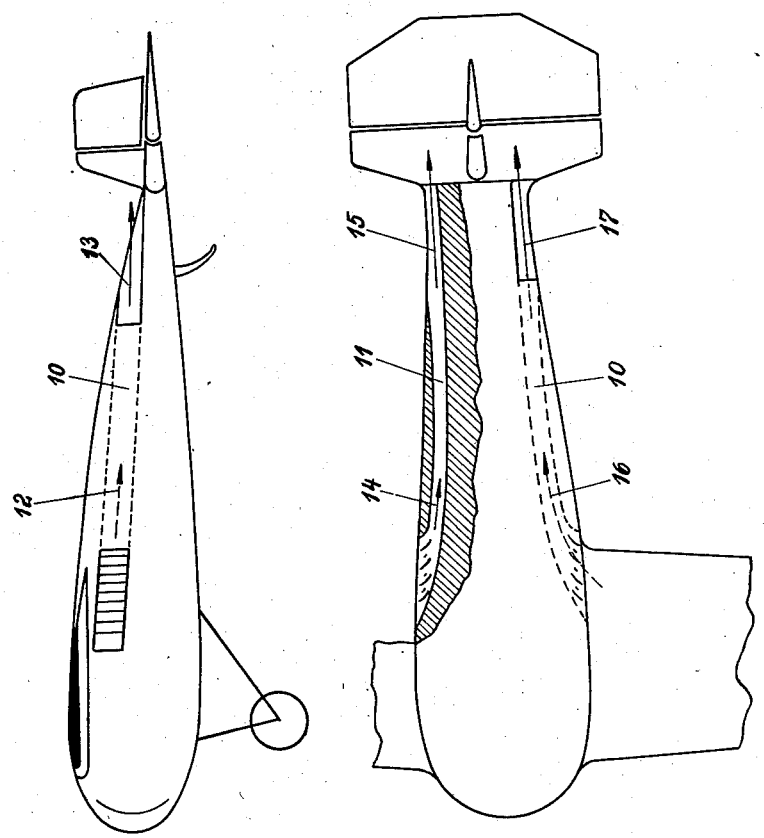
Figs. 8 and 9 are respectively elevation and plan views of an airplane fuselage with the invention applied thereto.

Figures 5, 6 and 7 show by way of example the arrangement of devices according to the invention within a supporting wing, in front elevation, in part sectional plan, and in section along I—I in Figure 6, while in Figures 8 and 9 is shown the arrangement of two reaction tubes running in the direction of the aeroplane fuselage, in side elevation and in part sectional plan.

In Figures 5, 6 and 7 is shown a reaction tube 6 through which flow takes place in the direction indicated by the arrows 7. The reaction tube lies completely within the aeroplane supporting wing shown, running from the tip of the wing to the fuselage, and is provided at the outlet near the fuselage with a bend 8 having a guide blade 9 (Figure 6).

The section in Figure 7 is shown viewed in the direction from the wing tip to the fuselage. From Figure 7 it will be seen that, corresponding to Figure 6, the direction of the outlet velocity of the accelerated masses, a reaction force acts as indicated by the arrow 7, which force is directed substantially forwardly and to a lesser extent upwardly. Hence, the aeroplane will normally be moved forward by this reaction force.

Figures 8 and 9 show two reaction tubes 10 and 11 which are arranged laterally inside the fuselage of an aeroplane. The construction of the tubes substantially corresponds to the reaction tube shown in Figures 1 to 4. The direction of flow of the accelerated masses is shown by the arrows 12, 13 and 14 to 17. It will be seen that the reaction force corresponding to the arrows 15 and 17 (or 13) drives the aeroplane forward in a manner similar to that effected by the propeller traction in normal aeroplanes.

In one application of the method according to the invention for the purpose, for example, of lifting an aeroplane from the position of rest on the ground in a vertical direction or generally, with reduced aerodynamic lift, to keep the aeroplane hovering, to lift it or to lower it, it is necessary to effect, at the outlet for the reaction masses a downward deflection of the flow by there providing means as for example guide blades or bends.

It is also preferable in those cases where vertically acting forces are to be transmitted to an aeroplane by the devices according to the invention, to expel the reaction masses at at least three places on the aeroplane. The said places will preferably be arranged in a substantially horizontal plane so as to form the corners of a triangle. Stability of the normal flying position cannot be attained by using less than three places of support constituted by the reaction forces of the expelled masses of gas and air, whereas, on the contrary, stability can be attained with certainty by the arrangement of three or more places of expulsion.

Figure 10 shows another constructional form in side elevation, and Figures 11 and 12 a further constructional form in side elevation and in plan, while Figure 13 shows a section along II—II in Figure 10.

In these two constructional forms, three reaction tubes are employed and are located adjacent one another in the bottom of an aeroplane fuselage.

Two of the said tubes, denoted by 18 and 19, lead from the rear to the front and are situated on the right and left hand of the centre line of the fuselage, while the third tube, denoted by 20, is arranged in the centre of the aeroplane fuselage and leads the reaction masses from the front to the rear. As was shown in Figure 6, deflecting blades are provided at the outlets for the reaction masses, so as to obtain a downwardly directed flow of the accelerated masses. This downward deflection of the accelerated masses naturally produces upwardly acting fores.

In Figure 10 is shown one of the reaction tubes (18 or 19) situated laterally of the central line of the aeroplane. The air flows in the direction of the arrow 21, that is, from the rear to the front, and it will be seen that the indicated deflecting blades 22 at the outlet 23 of the reaction tube deflect the air downwardly. Figure 11 shows the reaction tube 20 situated in the centre line of the aeroplane fuselage, the arrows 24 denoting the direction of flow of the accelerated masses which are deflected downwardly by the deflecting blades 25 at the outlet 26. Figure 12 shows the arrangement of the three reaction tubes in plan, i. e. viewed from above. The arrows 21 and 24 correspond to the arrow having the same reference numerals in Figures 10 and 11. It follows clearly from the illustrations that the expulsion places for the reaction masses are arranged in a substantially horizontal plane and form the corners of a triangle. The arrangement is further so contrived that the two expulsion places 23 are situated at a small distance in front of the centre of gravity of the aeroplane, while the explusion place 26 is situated at a greater distance behind the centre of gravity of the aeroplane. Consequently, the forces produced by the several reaction tubes are so accorded that, during stationary hovering of the aeroplane, the normal horizontal position is preserved. Consequently, in the present case, a considerably greater force will be produced at the outlets 23 than at the outlet 26.

When using a plurality of reaction tubes, it is also possible, by varying the effect of the several reaction tubes, to control the aeroplane for the purpose of maintaining a definite position or direction of motion. In order to attain this object, the quantity or the velocity of the masses expelled from the reaction chambers will be varied with respect to one another in the simplest manner by varying the propellant quantity of inflammable substance supplied to the different reaction chambers, whereby automatic regulation, for example of the equilibrium position of an aeroplane, may be secured with particular advantage by varying the quantity of inflammable substance or fuel in accordance with known instruments, indicating, for example, the equilibrium position of an aeroplane.

Devices for varying the quantity of propellant supplied to the different reaction chambers are shown in Figures 10, 11 and 13. In Figures 10 and 11, 27 denotes a tank filled with propellant, for example, petrol, 28 is a pump for the propellant and 29 is a driving motor for operating the pump 28.

In Figure 11, a regulating device 31 is included in the pipe line 30 which carries the propellant from the pump 28 to the reaction tube 20 shown situated in the middle of the aeroplane fuselage. The said regulating device comprises a three-way cock 32 which is operated by a pendulum 33. The arrow 34 indicates that the pendulum can swing outwardly to the right, the cock 32 being opened wider on this outward throw than when the pendulum 33 is placed in the position shown in the drawings. The pendulum 33 will swing outwardly to the right in the direction of the arrow 34, when the rear portion of the aeroplane fuselage sinks. Then, under the action of the regulating device 31, an increased supply of propellant takes place through the pipe 30 to the propellant injection point 35, whereby of course a greater effort is exerted on the masses of air in the reaction tube, so that an increased escape occurs through the outlet 26. The result of this increased effort, however, is to lift the rear end of the aeroplane fuselage. At the same time as the position of the aeroplane fuselage is brought back into the horizontal position, however, the pendulum arm 33 returns and hence the increased supply of propellant to the injection point 35 falls off, so that on the normal flying position being attained, the normal supply of propellant and production of force are again attained.

The regulating device 31 thus operates in such a way that when the reaction tube is working a certain normal quantity of propellant will always be introduced into the tube at the point 35. On the rear end of the aeroplane fuselage sinking, the said quantity will be increased by the regulating device 31 until the normal flying position has again been attained.

Figures 10 and 13 also show the corresponding regulating device for the two forwardly leading reaction tubes 18 and 19 situated laterally of the centre line of the aeroplane fuselage. From the pump 28, a pipe 36 leads to the regulator 37, from thence to two regulators 38 and 39, respectively, and then further to the propellant injection points 40 and 41. The regulating device 37, like the device 31 for the central reaction tube, effects, through the throw of the pendulum 42 in the direction indicated by the arrow 43, an increased supply of propellant to the injection points 40 and 41. An increased effort at the outlets 23 of the two lateral reaction tubes 18 and 19 is thereby attained. The function of the regulating device is therefore exactly the same as that of the device 31, so that on the downward inclination or dipping of the front portion of the aeroplane, the return to the normal flying position is brought about automatically by the regulating device.

The regulating devices 38 and 39 control the lateral position of the aeroplane, that is to say, the position at right angles to the flying direction. As shown in Figures 10 and 13, the propellant leaving the regulator device 37 enters the two regulating devices 38 and 39, to be supplied from thence to the injection points 40 and 41. On the pendulum 43 or 44 moving in the direction of the arrow 46 or 47, respectively, an increased supply of propellant will be effected to the injection points 40 or 41, thereby producing correspondingly increased efforts. In this way, therefore, the normal position of the aeroplane at right angles to the direction of flight will also be controlled automatically.

Of course, the arrangement shown in the drawings may be modified within wide limits according to the particular conditions. Obviously inclination regulators other than the pendulum devices shown may also be used.

The method according to the invention may be arranged together with a normal propeller drive, i. e. as supplementary drive, or also alone for propelling aeroplanes. In many cases, it will be particularly economical to arrange the propulsion device according to the invention in conjunction with a propeller drive, the propulsion device according to the invention being employed substantially only for the production of very particularly great efforts. The production of very particularly great efforts is chiefly to be desired at starting or in order to attain particularly high climbing powers and flying speeds. Moreover, it is preferable in many cases to provide the device according to the invention on aeroplanes as a safety reserve, which may be used as a substitute for the propeller drive in case of engine failure, while normally only the propeller will be used for driving the aeroplane. All these forms of application of the reaction drive according to the invention, which have been mentioned in the foregoing, increase the economy of flying to a particular extent, because remarkably high reaction forces may be obtained with an extremely small weight of apparatus by suitable selection of the additional quantities of air.

The devices required for carrying out the method according to the invention may be located at any place on aeroplanes or vehicles, since moving parts are avoided to a considerable extent, and almost completely with some constructional forms. The space they occupy is small in comparison with the effort attained, and their safety in working is excellent.

The explosion chambers of the inflammable mixture may either be separated from, or combined to form one unit with, the reaction chambers from which the masses of air and gas are expelled. Further, a plurality of reaction chambers may be fed by one explosion chamber, and also the reaction chambers may be provided with very large additional masses of air from a central point.

The method may be used both for aeroplanes which are to be moved very slowly (ascending and descending) as also for aeroplanes or vehicles which are to be moved very rapidly. In aeroplanes or the like which are to be moved very rapidly, the method according to the invention exhibits very advantageous effects chiefly for initiating the rapid motion, because very great accelerating forces can be produced with an economical consumption of inflammable agents. Moreover, however, the method according to the invention may also possess considerable advantages when it is a question of continuously maintaining a body in very rapid movement.

When the body which is to be influenced by the reaction forces moves in a medium other than air, this said other medium may be used, of course, as the additional mass which is accelerated by the explosion pressure of the inflammable mixture.

I claim:

1. The method of producing motive forces on aircraft and like vehicles by reaction, which comprises admitting a volume of fresh air into a chamber located on the vehicle and having an outlet, producing a pressure upon the air by exploding an explosion-expansive charge which is not greater than one-tenth of the mass of the air whereby to effect a movement of the air in the direction of said outlet and therewith a reaction movement of the vehicle.

2. The method of producing motive forces on aircraft and like vehicles, which comprises admitting a volume of fresh air into an elongated chamber located on the vehicle and having an outlet at one end, preparing an explosive mass in quantity not greater than one-tenth of the mass of said air, igniting the explosive mass and transmitting the pressure of the explosion to said volume of air at the end of the chamber opposite said outlet for effecting a movement of the air in the direction of said outlet and therewith effecting a reaction movement of the vehicle.

3. The method of producing motive forces on aircraft and like vehicles, which comprises intermittently admitting a volume of fresh air into a chamber located on the vehicle and having an outlet, admitting and exploding therein at a point remote from the outlet an inflammable substance in quantity to utilize only a small part of the air for combustion therewith, and employing the movement of the mass of air under the pressure produced by the explosion to create a reaction effect upon the vehicle.

4. An apparatus for producing motive forces on aircraft and like vehicles, comprising a tube having an air inlet and an outlet, means for preparing in said tube at a point remote from said outlet a combustible mixture in volume which is between one-tenth and one-fiftieth of the volume of said tube, means for igniting said mixture, and a valve for closing said inlet upon the explosion of said mixture.

5. The method of producing motive forces in rapid succession on aircraft and like vehicles which comprises admitting a volume of fresh air into a chamber located on the vehicle at an inlet end thereof so that the air flows toward an outlet at the other end of said chamber and substantially fills the same, producing a pressure upon the air by exploding an explosion-expansive charge in contact therewith whereby to effect a bodily movement thereof under said pressure in the direction of said outlet and create a reaction effect upon the vehicle, permitting the free escape of the air and exploded charge through said outlet, and repeating the steps in rapid succession whereby all movement of the air and exploded charge is substantially in the direction from said inlet toward said outlet.

6. The method of producing motive forces in rapid succession on aircraft and like vehicles which comprises admitting a volume of fresh air into a chamber located on the vehicle at an inlet end thereof so that the air flows toward an outlet at the other end of said chamber and substantially fills the same, exploding an explosion-expansive charge, and transmitting the pressure of the expanding charge products directly to said volume of air for effecting a movement of the air under such pressure in the direction of said outlet and therewith effecting a reaction movement of the vehicle and while permitting the free escape of the air and exploded charge through the outlet, and repeating the steps in rapid succession.

7. The method of producing motive forces in rapid succession on aircraft and like vehicles which comprises admitting a volume of fresh air into a chamber located on the vehicle at an inlet end thereof so that the air flows toward an outlet at the other end of said chamber and substantially fills the same, exploding an explosion-expansive charge adjacent said inlet in contact with the air for effecting a movement of the volume of air under the pressure of said charge in the direction of said outlet and therewith creating a reaction effect upon the vehicle and while permitting the free escape of the air and exploded charge through said outlet, and employing the energy of the moved air and charge for effecting the admission of a new volume of fresh air into said chamber through said inlet whereby all movement of the air and exploded charge is substantially in the direction from said inlet toward said outlet.

8. The method of producing motive forces in rapid succession on aircraft and like vehicles, which comprises admitting a volume of fresh air into a chamber located on the vehicle and having an inlet and an outlet at opposite ends thereof, establishing an explosion-expansive charge in the chamber adjacent the inlet, igniting the charge in contact with the air whereby to effect a movement of the air toward and through the outlet end of said chamber and thereby create a reaction effect upon the vehicle and while permitting the free escape of air and exploded charge through said outlet, and rapidly repeating the admission and ignition steps, said air and charge moving substantially only in the longitudinal direction of said chamber from the inlet toward the outlet thereof.

9. The method of producing motive forces in rapid succession on aircraft and like vehicles, which comprises admitting a volume of fresh air into a chamber located on the vehicle and having an inlet and an outlet at opposite ends thereof, intermittently admitting a combustible material into the portion of said volume of air adjacent said inlet whereby to produce successive explosion-expansive charges in limited quantity in relation to said volume, and individually igniting the successive charges while closing the inlet whereby to effect a movement of the air away from said inlet end of the chamber and thereby produce a reaction effect upon the vehicle while permitting the free escape of the air and exploded charges from said chamber through said outlet.

PAUL SCHMIDT.